Oct. 11, 1955     F. A. PAYNE, JR     2,720,368

AERODYNAMIC BALANCE FOR AIRCRAFT

Filed Nov. 3, 1951

Fred A. Payne, Jr.
INVENTOR.

BY *James H. Clark*

HIS PATENT ATTORNEY.

United States Patent Office 2,720,368
Patented Oct. 11, 1955

2,720,368
AERODYNAMIC BALANCE FOR AIRCRAFT

Fred A. Payne, Jr., Playa del Rey, Calif., assignor to North American Aviation, Inc.

Application November 3, 1951, Serial No. 254,687

10 Claims. (Cl. 244—83)

The present invention relates to aircraft controls and more particularly to improved boosted aerodynamic balance arrangements and mechanisms for the control surfaces of aircraft and like vehicles.

It is well known that the force required to move or displace a control surface increases with the angle through which the surface is displaced from its neutral position and also with the dynamic pressure to which the airfoil and its control surface is subjected by the relative air flow. In large aircraft, as well as in all aircraft operating at higher speeds, the control forces required to operate such control surfaces become so great that the pilot requires the assistance of a power boost or similar means in order to provide the necessary control of the craft. Inasmuch as the force required to displace the control surface increases both with its angular displacement and the increase in speed, it is also desirable that the surface be aerodynamically balanced to an extent to which the application of the pilot forces and the balancing forces of the power boost means are relatively smooth and gradual in their application and provide the pilot with adequate control "feel" of the surface and the connected control system.

The present invention relates to the improvements in such boosted aerodynamic control systems wherein all of these desirable characteristics are obtained with a simplified positive acting mechanism consisting essentially of an actuating cylinder pivotally connected to the leading edge of the control surface in a predetermined relationship with respect to its neutral axis and including a normally balanced valve, subjected to the dynamic pressure against which the airfoil is displaced, for regulating the pressure to the actuating cylinder.

It is accordingly a principal object of the present invention to provide a boosted aerodynamic balance for a control surface which is positive acting and reliable in its operation and which produces a balancing hinge moment which is proportional to the dynamic pressure and to the displacement or deflection of the control surface. It is a further object to provide a balance system of this type which can be made to simulate the aerodynamic balance to any degree required and in which the unbalanced loads are easily carried by the conventional control system. It is a further object to provide such a system in which the pressure changes with the dynamic pressure as distinguished from conventional boost systems in which the pressure changes with the angle of displacement and in which latter systems the power requirements are accordingly greater.

It is a further object of the present invention to provide an arrangement wherein the regulating valve is operated infrequently at a relatively small air flow and in which the possibility of valve chatter is reduced to a minimum. It is a further object to provide an aerodynamic balance suitable for use with any type of control system and with which no boost would be required. It is a still further object of this invention to provide a relatively safe boosted aerodynamic balance arrangement, the operation of which is not materially affected by a power failure and one in which power failure can be met merely by restricting the speed of the airplane to one no greater than that at which the failure occurred. Among a number of further objects of the present invention are the provision of an aerodynamic balance having the ability to operate well at low temperatures, its utilization of simple and conventional parts and the provision of a control surface trim arrangement having low drag characteristics preferable for high speed operation.

Other objects and advantages of the present invention will become apparent to those skilled in the art after reading the following description taken in conjunction with the accompanying drawings, forming a part hereof, in which.

Figure 1:
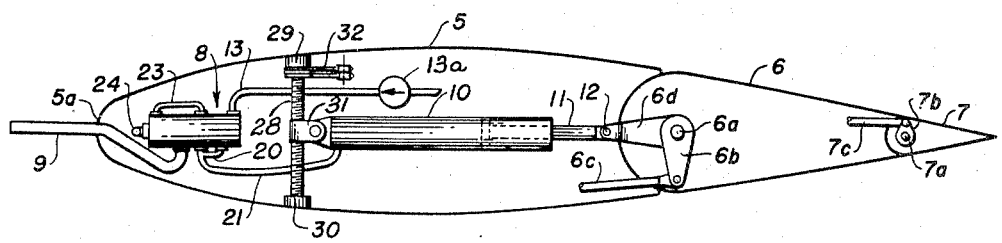
Fig. 1 is a sectional elevation of an airfoil to which a form of the present invention has been applied.

Referring to Fig. 1, the numeral 5 indicates the main relatively fixed portion of an airfoil or wing at the trailing portion of which the control surface 6 is hingedly mounted as by the pivot 6a. The control surface 6 may be one of the ailerons of the aircraft, or it may either be the elevator or the rudder, in which case the fixed airfoil 5 would be the horizontal or vertical stabilizer, respectively. The control surface 6 may be provided at its trailing edge with a tab 7 pivotally mounted upon the pivot 7a upon which is fixed the control arm 7b actuatable by the push-pull rod 7c. The control surface 6 also has a control arm 6b attached to its pivot 6a and actuatable by means of the push-pull rod 6c. It will be understood that the push-pull rods 6c and 7c are each operatively connected to the respective control instrumentalities of the control system of the airplane, for either manual control by the pilot or power boost control in a well known manner which has not been illustrated in the drawings inasmuch as it does not form a novel portion of the present invention.

A pressure regulating valve 8 is preferably disposed within the leading edge portion 5a of the air foil 5, having one of its interior chambers open to a forwardly extending tube or conduit 9 subjected to dynamic air pressure as the aircraft moves forwardly in flight. The details of this regulating valve will be more particularly described below in conjunction with the description of Fig. 3, and its function is the control of the pressure supplied to the cylinder of the fluid actuating motor 10. The latter is provided with a piston 11 pivotally connected at 12 to a forwardly extending second arm 6d fixedly mounted upon the pivot 6a of the control surface 6. The fluid motor 10 is preferably of the pneumatic type, altho in certain installations it may be hydraulic, and it receives its fluid pressure from a suitable high pressure source supplied through the conduit 13 extending initially to the regulating valve 8.

Figure 3:
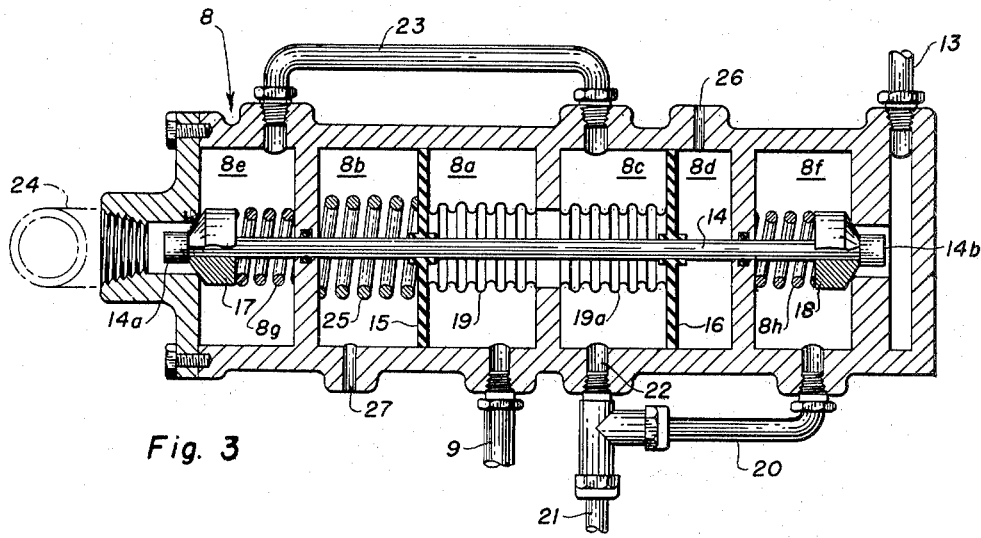
Fig. 3 is an enlarged sectional view of the pressure regulating valve.

Referring now to Fig. 3, the regulating valve 8 is provided with a casing which may be of cylindrical shape divided interiorly into a plurality of chambers or compartments 8a, 8b, 8c, 8d, 8e and 8f. An inlet connection is provided at the right or aft end for the high pressure fluid conduit 13 and an inlet is provided in the chamber 8a for the conduit 9 through which a so-called "q" signal from the dynamic pressure tube is received. Along the axis of the valve there is provided a central rod 14 to which a pair of flexible diaphragms 15 and 16 are attached and which form the equivalent of piston elements within the central pair of chambers 8a—8b and 8c—8d. These chambers are arranged in tandem and the rod 14 which passes longitudinally therethrough is attached to each of the diaphragms 15 and 16. Spring-pressed check valves 17 and 18, biased by the springs 8g and 8h, respectively, are opposedly mounted adjacent the outer ends of the rod 14. An evacuated bellows comprising the sections 19 and 19a, are positioned between the diaphragms 15 and 16 and are secured to the rod 14 in a sealed relationship. The end portions of the bellows lie within the respective chambers, namely the portion 19 within the chamber 8a, and the portion 19a within the chamber 8c. The valve elements 17 and 18 are slidably mounted upon the central rod 14, on which the enlarged end portions 14a and 14b are provided to form shoulders, each of which engages the nose portion of its respective valve. This permits one or the other of the valves 17 and 18 to be opened without disturbing the opposite valve, the springs 8g and 8h serving to maintain the slidable valve elements in engagement with the respective end portions and to assist in reseating the valve when a balance has been re-established.

In the operation of the valve 8, pressure admitted to the interior through the conduit 13 is normally cut off in the balanced position of the valve by the normally closed condition of the valve 18. Dut to the forward flight of the aircraft the dynamic or "q" pressure is admitted to the chamber 8a through the conduit 9 the opposite or forward and open end of which is directed into the airstream through the leading edge 5a of the wing. This dynamic pressure surrounds the bellows portion 19 and varies with the "q" signal input due to variations in the relative airspeed. An increase in this pressure tends to move the rod 14 to the left by reason of the force exerted upon the diaphragm 15, the opposite end of the chamber 8a formed by the dividing partition between the chambers 8a and 8c, being fixed to the casing of the valve. This movement of the rod 14 to the left unseats the right hand valve element 18, allowing high pressure air to pass from the inlet 13 through the valve chamber 8f and through the conduits 20 and 21 to the cylinder of the fluid motor 10 for increase in the pressure against the piston reciprocable therein, and the attached piston rod 11. The pressure in the chamber 8f is also admitted to the chamber 8c through the connection 22 in the space surrounding the bellows portion 19a, where this pressure acts upon the diaphragm 16 tending to urge the central rod 14 to the right. This permits the valve 18 to close and shut off the high pressure from the conduit 13, at which time a pressure balance has again been established between the chambers 8a and 8c by virtue of the movement of the diaphragms 15 and 16.

Conversely, decrease of the pressure in the chamber 8a due to a drop in the magnitude of the "q" signal will tend to move the rod 14 to the right. This results in unseating the left hand valve element 17, allowing the pressure in the actuating cylinder of the motor 10 to be reduced. This pressure reduction within the cylinder and in the space 8c is effected through a conduit 23 which connects with the left hand valve chamber 8e. The excess pressure is bled over-board through the opened valve 17 and out through the conduit 24 to the atmosphere until a pressure balance is reestablished between the chambers 8a and 8c whereupon the rod 14 will move to the left to permit the valve element 17 to reclose. The central spring 25 is provided to assist in obtaining the desired balance characteristics for the valve unit and may preferably be provided with means for its adjustment. The chambers 8b and 8d on the back-side of the pistons or diaphragms 15 and 16 are vented at 27 and 26, respectively, to atmospheric pressure.

Returning now to Figs. 1 and 2, it will be noted that a high pressure from the conduit 13, as controlled by the valve 8, is exerted through the conduit 21 and the actuating chamber of the fluid motor 10, to exert rearward pressure against the forwardly aligned arm 6d of the control surface 6 in its neutral position. The forward terminal of the fluid motor 10 is pivotally mounted upon an adjustable transversely disposed jack screw 28 upon which the nut member pivot 31 is adjustably mounted. The jack screw 28 is journaled in the end bearings 29 and 30 adjacent the surfaces of the airfoil 5 and suitable control mechanism 32 is provided for translation of the pivot nut 31 along the screw 28. The pivot nut element 31 forms the forward pivotal anchorage of the cylinder of the fluid motor 10 and is translatable transversely into positions such as that indicated in Fig. 2 in which it has been moved toward the bearing 30 from the normal central position C in which it is shown in Fig. 1, this translation being for a purpose which will be hereinafter more fully described.

Figure 2:
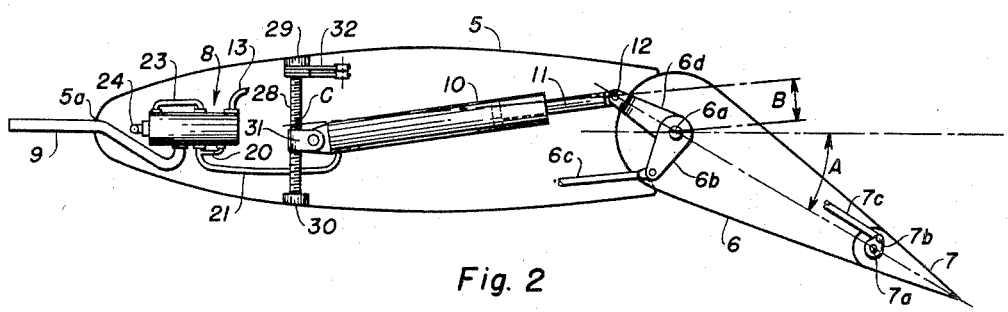
Fig. 2 is a similar view with the control surface shown in a displaced position.

In the neutral position of the control surface 6, and the fluid motor 10, as shown in Fig. 1, any displacement of the control surface through an angle such as A, as indicated in Fig. 2, will create a moment which is proportional to the angle A and the dynamic or "q" pressure exerted through the pressure tube 9. From the description of the operation of the regulating valve it has been noted that the actuating cylinder of the fluid motor 10 is subjected to pressure in proportion to the dynamic or "q" pressure exerted through the pressure tube 9. It will also be noted that as the control surface 6 is deflected through the angle A, the pivotal connection 12, in being rotated about the neutral axis of the airfoil, provides a moment arm B as indicated in Fig. 2. Therefore, when the forward pivotal connection 31 of the fluid motor 10 is in its central position at C, and the surface is rotated through the angle A, there is provided a clockwise hinge moment about the axis of the pivot 6a which is at all times proportional to the counterclockwise force exerted upon the displaced control surface 6 through the same angle A and the dynamic pressure to which it is subjected.

It is therefore noted that the boosted aerodynamic balance of the surface 6 produces a hinge moment which is proportional to the dynamic or "q" pressure and to deflection, and that this system can be made to simulate aerodynamic balance to any degree required. The unbalanced loads, or the differences in the forces exerted upon the displaced surface and that exerted by the fluid motor 10, are provided by the pilot through the medium of the push-pull connection 6c and the lever arm 6b, or other corresponding elements of the conventional control system.

A moderate amount of low drag trim may be introduced by rotation of the jack-screw 28 in the desired direction to displace the pivot nut 31 to either side of the central position C. As shown in Fig. 2, the jack-screw 28 has been rotated by its actuating mechanism 32 such that the pivot nut 31 has been moved downwardly or inwardly toward the bearing 30, and to a position below its normal or neutral alignment with the pivots 12 and 6a, the internal pressure within the cylinder 10 tending to extend the piston 11 thereby causing a corresponding amount of trim of the control surface 6 by rotating the control surface in the clockwise direction about its pivot 6a, establishing at the same time a new neutral position from which the surface may be displaced in either direction with the aid of the boosted aerodynamic balance force provided by the fluid motor 10. Movement of the pivot nut 31 in the opposite direction toward the bearing 29 will cause the pivot 12 to be displaced below the straight line connecting the pivots 31 and 6a, and will deflect the surface 6 upwardly or in the counterclockwise direction. Inasmuch as the air pressure is trapped within the cylinder of the fluid motor 10, with no flow required for its operation, the airplane may be flown at any speed below that at which a failure might occur in the air supply. The manually operated trim tab 7, preferably inset at the trailing edge of the control surface 6, may be utilized for emergency trim conditions and for high trim demands.

Other forms and advantages of the present invention, which may occur to those skilled in the art after reading the foregoing description, both with respect to its general arrangement and the details of its respective parts, are intended to come within the scope and spirit of this

I claim:

1. In aircraft, a relatively fixed airfoil, a control surface pivotally mounted upon said airfoil, actuating means operatively connected to said control surface for displacing said control surface with respect to said airfoil, a fluid motor pivotally connected to said fixed airfoil and to said control surface for applying balance forces to said control surface to assist said actuating means in the displacement of said control surface, the pivotal connections of said fluid motor to said airfoil and to said control surface aligned with the axis of said pivotal mounting of said control surface in the neutral position of said control surface, a source of fluid pressure, and aerodynamic balance means including a balanced valve in fluid communication with said fluid pressure source and with said fluid motor, dynamic pressure means in fluid communication with said balanced valve arranged for regulating said fluid pressure to said fluid motor in accordance with the dynamic pressures to which said airfoil is subjected for producing a balance force which is proportional to the dynamic pressure, as well as to the deflection of said control surface by virtue of the said pivotal alignment.

2. In aircraft, a relatively fixed airfoil, a control surface hingedly mounted upon said airfoil, actuating means operatively connected to said control surface for angularly displacing said control surface with respect to said airfoil, a fluid motor pivotally connected to said fixed airfoil and to said control surface for applying balance forces to said control surface to assist said actuating means in overcoming aerodynamic forces opposing displacement of said control surface, the pivotal connectons of said fluid motor to said airfoil and to said control surface aligned with the axis of said pivotal mounting of said control surface in the neutral position of said control surface, a source of fluid pressure, a balanced valve in fluid communication with said fluid motor and with said source of fluid pressure, and a dynamic pressure tube adjacent the leading edge of said airfoil in fluid communication with said balanced valve for regulating said fluid pressure to said fluid motor in accordance with the dynamic pressure to which said airfoil is subjected for producing a balance force in said control surface which is proportional to the dynamic pressure and which is also proportional to the deflection of said control surface by virtue of the said pivotal alignment of said control surface and said fluid motor.

3. In a boosted aerodynamic balance for aircraft, a main airfoil, a control surface pivotally mounted upon said main airfoil, actuating means operatively connected to said control surface for displacing said control surface with respect to said main airfoil, a pivotal connection carried by said control surface, a fluid motor having a forward terminal pivotally supported by said main airfoil and an aft terminal connected to said pivotal connection carried by said control surface, the forward pivotal support and the aft pivotal connection of said fluid motor being aligned fore and aft with the pivot axis of said control surface in the neutral position of said control surface with respect to said airfoil, a source of fluid pressure for said fluid motor, dynamic pressure sensing means carried by said main airfoil, and valve means in fluid communication with said fluid pressure source and said dynamic pressure sensing means, said valve means in fluid communication with said fluid motor for regulating the fluid pressure from said pressure source to said fluid motor in accordance with the dynamic pressure developed by said main airfoil for applying a boosted balance force to said control surface in accordance with the dynamic pressure to which said airfoil is subjected.

4. In a boosted aerodynamic balance for aircraft, a relatively fixed main airfoil, a control surface pivotally mounted upon said main airfoil, actuating means operatively connected to said control surface for displacing said control surface from its aligned neutral relationship with respect to said main airfoil, a pivotal connection carried by said control surface forward of its pivotal mounting upon said main airfoil, a fluid motor having a forward terminal pivotally supported by said main airfoil and an aft terminal connected to said forward pivotal connection carried by said control surface, the forward pivotal support and the aft pivotal connection of said fluid motor being aligned fore and aft with the the pivot axis of said control surface in the neutral position of said control surface with respect to said airfoil, a source of fluid pressure for said fluid motor, dynamic pressure means carried by said main airfoil, valve means for regulating the fluid pressure from said pressure source to said fluid motor in accordance with the dynamic pressure developed by said main airfoil, conduit means connecting said valve means with said fluid motor, said pressure source and said dynamic pressure means for applying a balance force to said control surface through said normally aligned fluid motor proportional to the displacement of said control surface as determined by the said pivotal connection relationship and proportional to the dynamic force caused by said displacement as determined by the dynamic pressure to which said airfoil is subjected.

5. In a boosted aerodynamic balance for aircraft, a relatively fixed main airfoil, a control surface pivotally mounted upon said main airfoil, actuating means operatively connected to said control surface for displacing said control surface from its aligned neutral relationship with respect to said main airfoil, a pivotal connection carried by said control surface forward of its pivotal mounting upon said main airfoil, a single-acting fluid motor having a piston extending chordwise of said airfoil having a forward terminal pivotally supported by said main airfoil and an aft terminal connected to said forward pivotal connection carried by said control surface, the forward support and the aft pivotal connection of said fluid motor being aligned fore and aft with the pivot axis of said control surface in the neutral position of said control surface with respect to said airfoil, a source of fluid pressure for said fluid motor tending to extend said piston therefrom, a dynamic pressure tube carried by said main airfoil, valve means in fluid communication with said source of fluid pressure and said dynamic pressure tube, said valve means in fluid communication with said single-acting fluid motor for regulating the fluid pressure from said pressure source to said fluid motor in accordance with the dynamic pressure developed by said main airfoil for applying a balance force to said control surface proportional to the displacement of said control surface by said extension of said piston from said motor as determined by the said pivotal alignment of said motor and said control surface and proportional to the dynamic force caused by said displacement as determined by the said dynamic pressure to which the said tube carried by said airfoil is subjected and manually controlled means operatively connected to said single-acting fluid motor for laterally adjusting the forward pivotal terminal of said fluid motor for changing the said pivotal alignment for applying low drag trim adjustment to said control surface by providing a new aligned neutral relationship of said control surface with respect to said airfoil.

6. In a boosted aerodynamic balance mechanism for an aircraft control system, a movable control surface, a pilot operated member operatively connected to said movable surface for its control, said balance mechanism including a single-acting fluid motor including an extendable piston operatively connected to said movable surface, a source of fluid energy for said fluid motor, a balanced valve means in fluid communication with said source of fluid energy for said fluid motor and in fluid communication with said fluid motor, and a dynamic pressure inlet in fluid communication with the airstream and with said balanced valve means arranged to increase the fluid pressure from said fluid energy source to said fluid motor in accordance with increase in the speed of the aircraft through said airstream, said fluid motor supported upon fixed structure at a forward terminal and connected at an opposite terminal to a pivot carried by said movable surface, the said connections of said fluid motor and its extendable piston to said fixed structure and to said movable surface being aligned in the neutral position of said movable surface with the axis of rotation of said movable surface arranged in such manner that the pilot operated movement of said member and displacement of said movable surface from said neutral position is assisted by the extension of said fluid motor under the influence of said dynamic pressure at various airspeeds and such displacement of said movable surface is assisted as said displacement is increased from the pivotal alignment of said neutral position.

7. In a boosted aerodynamic balance mechanism for an aircraft control system, an airfoil, a movable surface pivotally mounted upon said airfoil, a pilot operated member operatively connected to said movable surface, said balance mechanism comprising an extensible fluid motor operatively connected to said movable surface, a source of energy for extending said fluid motor, a balanced valve means in fluid communication with said source of energy and in fluid communication with said fluid motor, and a dynamic pressure inlet disposed at a surface of said airfoil fluidly communicating the airstream with said balanced valve means arranged to increase the fluid energy from said energy source to said fluid motor proportionately with increases in the speed of the aircraft through said airstream, said fluid motor pivotally mounted upon fixed structure at a forward terminal and pivotally connected at its aft terminal to a pivot carried by said movable surface, the said pivotal connection of said fluid motor to said fixed structure and to said movable surface being aligned in the neutral position of said movable surface with the axis of rotation of said movable surface arranged in such manner that pilot operated movement of said member and displacement of said movable surface from said neutral position is assisted by extension of said fluid motor as said angle of displacement is increased from said neutral position.

8. In a boosted aerodynamic balance mechanism for an aircraft control system, an airfoil, a movable control surface pivotally mounted upon said airfoil, a control member operatively connected directly to said control surface, an extensible fluid motor operatively connected to said control surface, a source of energy for said fluid motor, a balanced regulator valve in fluid communication with said source of energy for said fluid motor and in fluid communication with said fluid motor, a dynamic pressure inlet at the leading edge of said airfoil fluidly communicating the airstream with said balanced regulator valve arranged to regulate the flow of fluid energy from said source to said fluid motor with variation in speed of the airfoil through said airstream, said fluid motor pivotally mounted upon the airfoil at a forward terminal and pivotally mounted to a pivot carried by said control surface, the said pivotal connection of said fluid motor to said fixed structure and to said control surface being aligned in the chordwise direction in the neutral position of said control surface with the axis of rotation of said control surface, the direct operative connection of said control member to said control surface being separate and offset from said aligned pivotal connections arranged in such manner that direct actuation of said control member and displacement of said control surface from said neutral position is assisted by said fluid motor as said angle of displacement is increased from said neutral position, and pilot operated means operatively connected to said forward terminal of said fluid motor arranged to shift said chordwise alignment of said fluid motor for imparting a trim adjustment to said control surface and for establishing a further aligned relationship of said pivotal connections angularly disposed with respect to said neutral position alignment.

9. In a control system for aircraft having an airfoil, a control surface movable between a neutral and a displaced position, wherein, when said control surface is displaced from said neutral position the relative airflow thereover imposes an opposing force proportional to the airspeed and to the control surface displacement, a control member directly operatively connected to the control surface for displacing the same from said neutral position, and means operatively connected to said control surface for imposing an assisting displacing force on said control surface, the improvement wherein said means includes an inlet on a surface of said airfoil arranged for the admission of dynamic pressure, a source of fluid pressure, an extensible fluid motor, and balanced valve means in fluid communication with said dynamic pressure inlet and with said fluid pressure source, said valve means being in communication with said fluid motor arranged for the automatic regulation of said fluid motor by the control of said fluid pressure from said fluid pressure source, as determined by the dynamic pressure acting upon said balanced valve means.

10. In a control system for aircraft having an airfoil, a control surface movably mounted upon said airfoil between a neutral and a displaced position, wherein, when said control surface is displaced from said neutral position the relative airflow thereover imposes a force proportional to airspeed and to control surface displacement, a pilot-operated control member directly operatively connected to the control surface for displacing the same from said neutral position, and aerodynamic balance means operative on and in response to said control surface displacement for imposing an assisting displacing force on said control surface proportional both to the degree of displacement and to the relative airspeed, the improvement in said aerodynamic balance means which includes the provision of an inlet on a surface of said airfoil arranged for the admission of dynamic pressure, a source of fluid pressure, an extensible fluid motor operatively connected to said control surface, and a normally balanced valve means subjected to said dynamic pressure and said fluid pressure source, said balanced valve means in communication with said fluid motor arranged for the automatic regulation of the extension of said fluid motor by the control of said fluid pressure thereto from said fluid pressure source as determined by the dynamic pressure acting upon said balanced valve means through said dynamic pressure inlet.

References Cited in the file of this patent
UNITED STATES PATENTS

| Number | Name | Date |
|---|---|---|
| 2,295,159 | Child | Sept. 8, 1942 |
| 2,368,059 | White | Jan. 23, 1945 |
| 2,395,671 | Kleinhans et al. | Feb. 26, 1946 |
| 2,492,252 | Wing | Dec. 27, 1949 |
| 2,515,475 | Shoemaker | July 18, 1950 |
| 2,522,284 | Lecarme | Sept. 12, 1950 |
| 2,541,922 | Hosford | Feb. 13, 1951 |
| 2,548,787 | Heberding | Apr. 10, 1951 |
| 2,559,817 | Ashkenas | July 10, 1951 |
| 2,591,871 | Richolt | Apr. 8, 1952 |
| 2,596,242 | Hill | May 13, 1952 |
| 2,638,289 | McKellar et al. | May 12, 1953 |